United States Patent [19]

Childers

[11] Patent Number: 5,079,845
[45] Date of Patent: Jan. 14, 1992

[54] DUAL READOUT ANALOG/DIGITAL MAGNETIC COMPASS

[75] Inventor: Weldon L. Childers, Phenix City, Ala.

[73] Assignee: Futurity Technologies, Inc., Columbus, Ga.

[21] Appl. No.: 575,832

[22] Filed: Aug. 31, 1990

[51] Int. Cl.$^5$ ............................................. G01C 17/26
[52] U.S. Cl. ................................... 33/363 K; 33/364; 33/355 R
[58] Field of Search ............ 33/355 R, 363 R, 363 K, 33/364, 351, 352, 354, 272, 273

[56] References Cited

U.S. PATENT DOCUMENTS

| | | | |
|---|---|---|---|
| 1,221,738 | 4/1917 | Isom | 33/352 |
| 1,885,098 | 10/1932 | Hill | 33/363 K |
| 4,095,348 | 6/1978 | Kramer | 33/363 K |
| 4,146,970 | 4/1979 | Edwards | 33/363 K |
| 4,577,414 | 3/1986 | Migliori et al. | 33/363 K |

Primary Examiner—Harry A. Haroian
Attorney, Agent, or Firm—Allen M. Lenchek

[57] ABSTRACT

A magnetic compass in which a conventional compass card provides an analog readout of compass heading and a binary coded digital disk together with fiber optic sensing technology provides a digital readout of compass heading contained within a single housing, together with a gravity driven inclinometer providing a measurement of the inclination of the ground. The compass magnet is shielded by Faraday type shielding from the electronics that processes the digital reading. An analog electronic readout of both compass heading or inclination, capable of remote display, is provided by a tapered iris disk and fiber optic reader combination. A magnetic compass employing a compass disk with a reflecting tapered iris on one side of the disk sensed by a reflecting fiber optic reader and a standard compass card on the other side which can be read visually provides an improved magnetic compass being very compact and providing both analog and digital readouts.

10 Claims, 4 Drawing Sheets

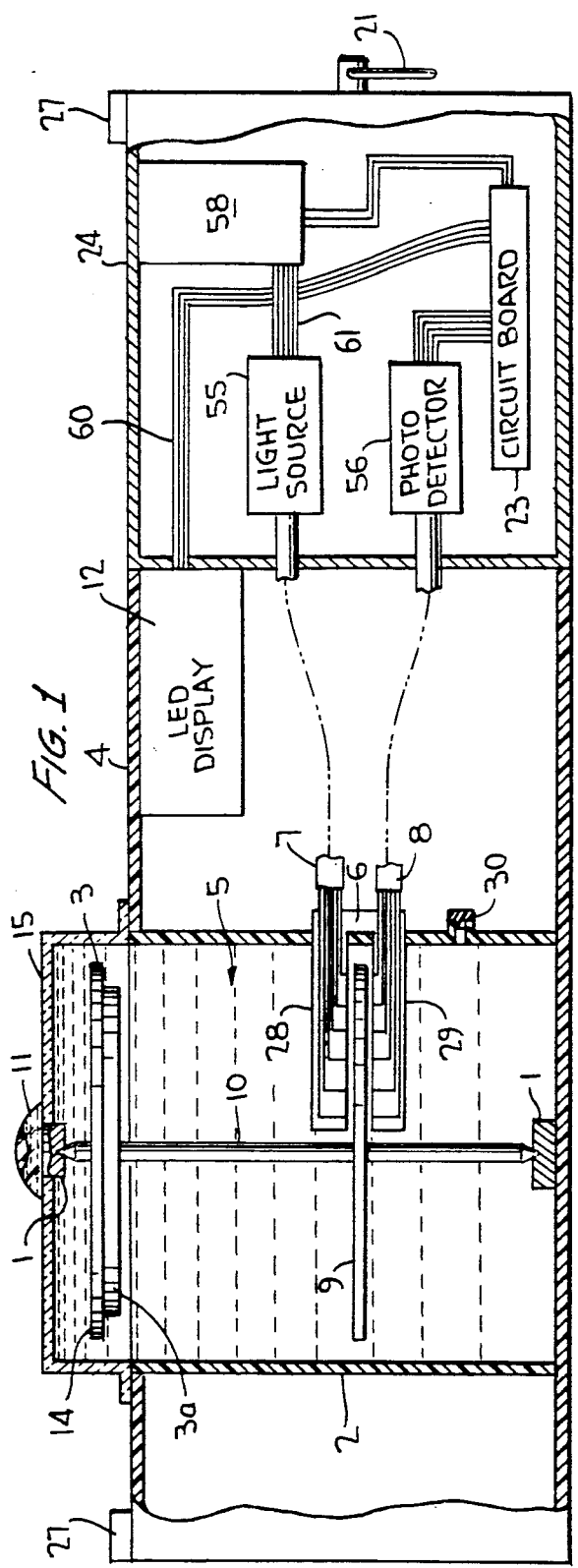
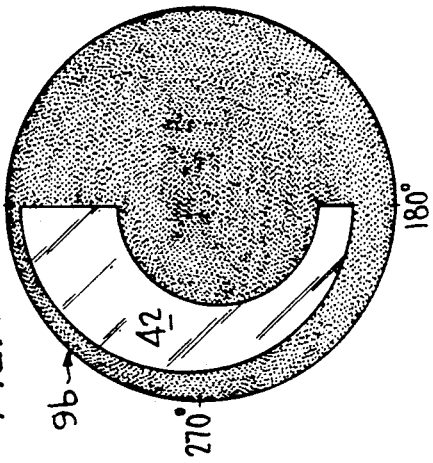
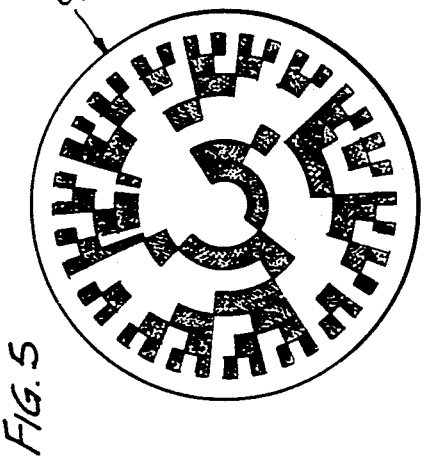

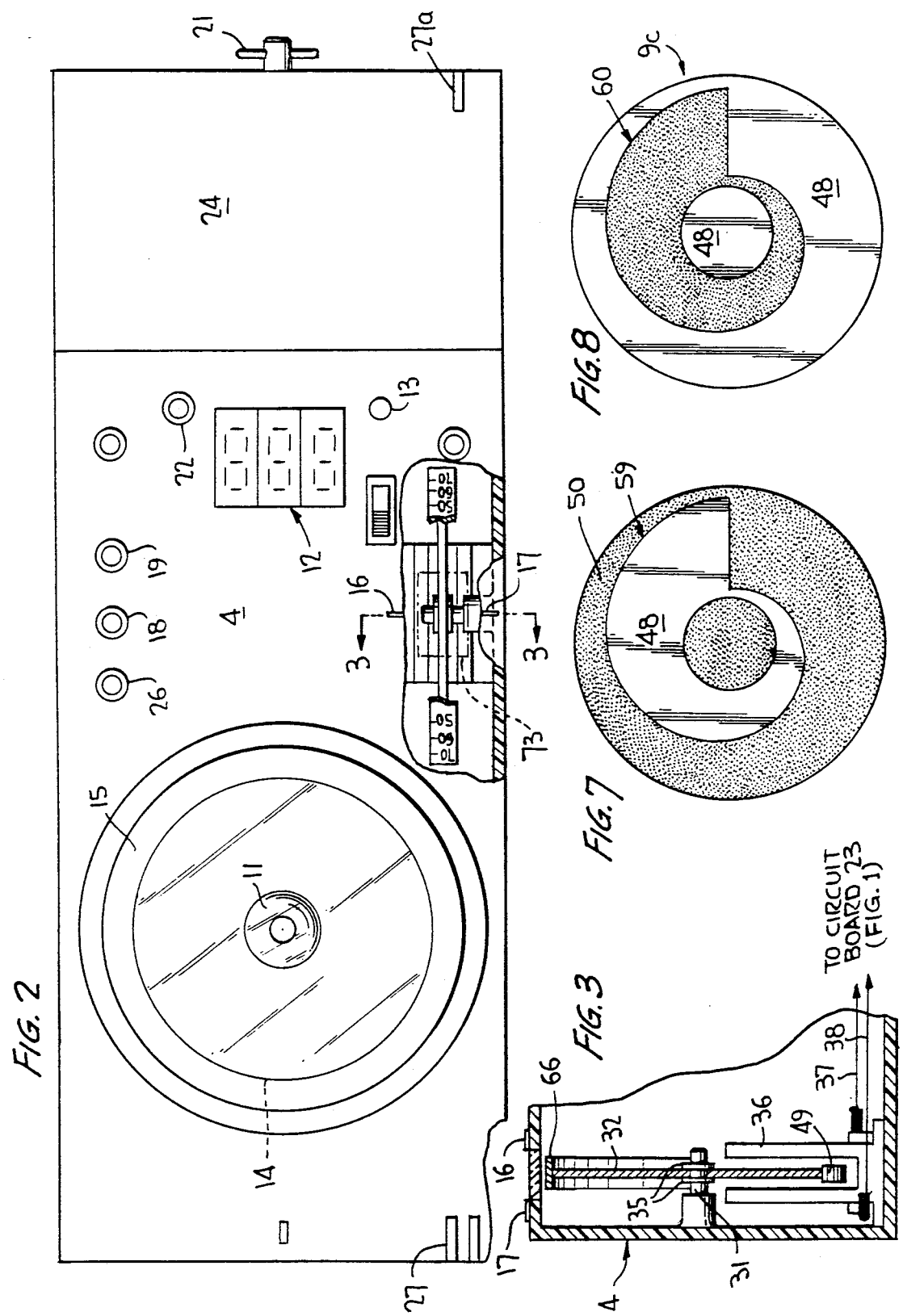

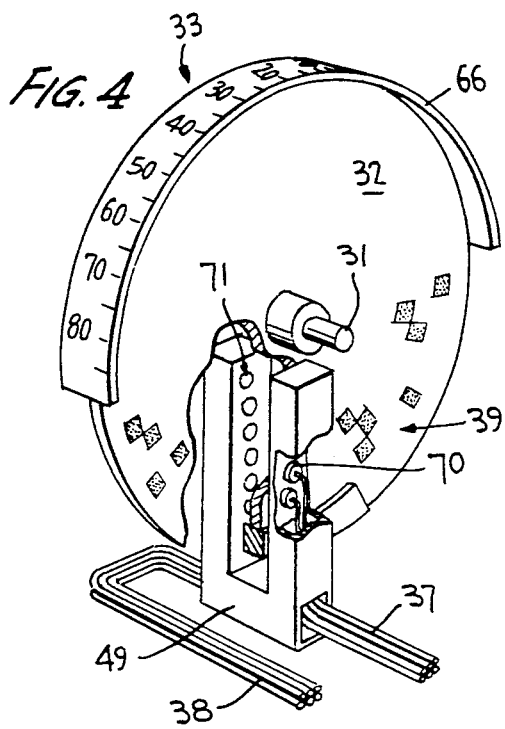
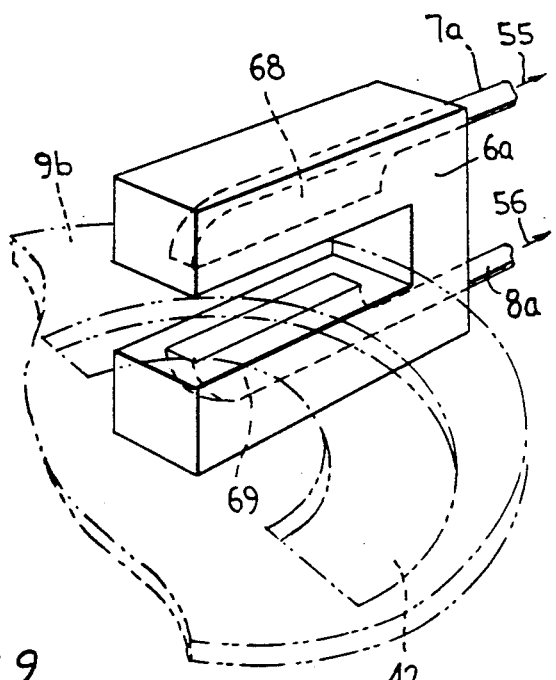
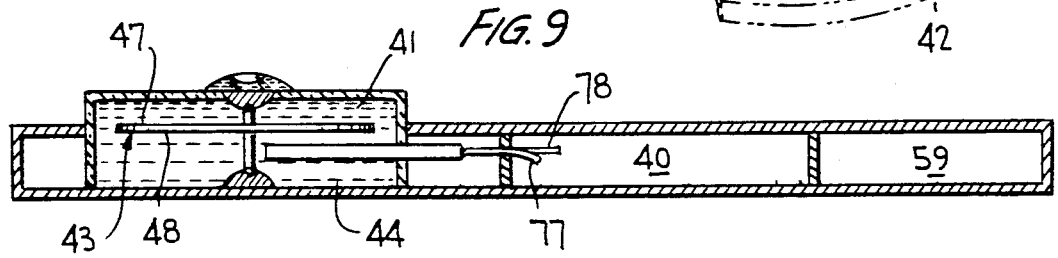
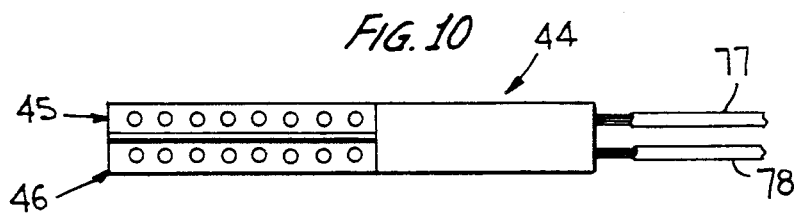
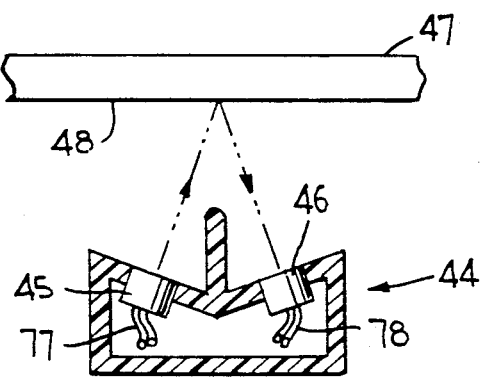

DUAL READOUT ANALOG/DIGITAL MAGNETIC COMPASS

BACKGROUND OF THE INVENTION

1. Field of the Invention

The invention relates to magnetic compasses and more particularly to a magnetic compass with both a digital and an analog readout.

2. Description of the Prior Art

There is a need for a dual readout (digital and analog) magnetic compass that displays both forms of readout in a single housing without interference between the electronic circuitry associated with the digital readout and the compass magnet without excessive cost and is also capable of being operated in a remote readout mode. Dual readout magnetic compasses are well known. U.S. Pat. No. 4,139,951 discloses a dual readout compass. However, it utilizes a rotating conductor such as a coil, which makes it significantly more expensive than compasses utilizing a simple permanent magnet compass card or magnetic needle.

Digital readout compass displays, too, are known in the art. See, U.S. Pat. Nos. 3,888,016, 4,075,619 and 4,139,951. However, the familiar permanent magnet compass, when combined with a digital readout, is subject to interference between the magnet and the electromagnetic fields generated by the digital readout electronics. The digital readout employs electronic logical circuitry. This circuitry generates electromagnetic fields. When the circuitry is in close proximity to the magnetic needle of the compass, the stray magnetic fields generated by the circuitry affect the magnet, thus preventing it from accurately responding to the earth's magnetic field. The problem may be particularly troublesome when compass headings of fractions of a degree are sought or when the compass is placed in the instrument panel of, say, an aircraft, where it is surrounded by numerous gauges and instruments employing electromagnets to operate dials and counters. The interference between such instruments and the magnetic compass may be reduced by isolating the compass, as by locating the compass on a remote part of the aircraft, say, a wingtip, and employing a remote readout device to display the compass heading in the cockpit. In such a configuration, there still remains interference between the magnetic compass and the magnetic fields generated by the remote readout electronics. The interference between the compass magnet and the digital readout electronics may be reduced by shielding the circuitry with a Faraday type shield.

It is a principal object of this invention to provide a magnetic compass with dual readouts capable of displaying headings in analog and digital forms in a single housing with the capability for remote display of the digital reading. The principle of dual readout allows a continuous compass capability in all weather conditions as well as operation in night and daytime lighting conditions.

A second object of this invention is to provide a dual readout magnetic compass with the capability of measuring the inclination or slope of the ground upon which the instrument is in use and providing dual readout of the inclination in analog and digital form.

A third object of the invention is to provide a magnetic compass with digital readout that is not susceptible to distortion of the magnetic heading by electromagnetic influence of the electronic circuitry associated with the digital readout.

A fourth object of the invention is to provide an analog electronic readout of a magnetic compass by use of an analog optically encoded disk viewed by an electronic sensor such that the output voltage of the sensor is directly related to the heading.

A fifth object of the invention is to provide an improved magnetic compass that provides dual readout in a compact, inexpensive instrument.

SUMMARY OF THE INVENTION

The invention consists initially of a dual disk configuration. The two disks are rigidly connected by a shaft connecting their centers forming a dumbbell configuration. The disks are rotatably mounted in a compass body or housing. One of the disks is a standard compass dial bearing a permanent magnet. The other disk is a binary coded disk (BCD) or an analog optically coded disk of novel design, depending upon which embodiment of the invention is chosen.

The binary coded disk is constructed of optically transparent material upon which is imprinted BCD opaque markings and is read by a fiber optic reader connected to standard digital circuitry.

The circuitry is enclosed by a Faraday cage type shield. The disk carrying the compass magnet is outside the shield and some distance away from the circuitry, being thereby shielded from any electromagnetic signal generated by the circuitry.

The optically coded analog disk is opaque except for a linearly tapered transparent opening, or iris, through the disk. The boundary of the iris has a shape that has two radially oriented edges located on opposite sides of the center of the disk and two generally concentric edges which taper from one radial edge to the other so that the radial width of the iris varies in smooth fashion from one half of the disk to the opposite half. A slit-shaped or ribbon-shaped light source is positioned on one side of the disk in light-receptive opposition to an opposing congruently shaped light detector. As the disk rotates, the taper of the iris causes the amount of light traversing the disk to vary in a continuous fashion. The light detector generates an output voltage directly proportional to the intensity of the transmitted light, causing the output voltage to vary in continuous fashion as the azimuthal position of the disk varies. The result is an analog voltage signal that may be easily calibrated to read out the azimuth of the disk.

In the preferred embodiment of the invention, the light is generated by an incandescent lamp. Light-emitting diodes(LED) or laser diodes may also be used. The light detector is a photodetector array in a linear configuration.

A third disk and second fiber optic reader in combination comprises an inclinometer for measuring the inclination or slope of the ground upon which the instrument rests. This measure is an important geographic parameter. The third disk is rotatably mounted with the plane of the disk in the vertical plane with respect to the ground and is pivoted at its center freely rotatable about an axle oriented in the horizontal plane. One half of the disk is either binary encoded or constructed in the tapered iris configuration to permit measurement of azimuthal positions about the axis formed by the axle. The other half of the disk is weighted. When the disk is allowed to rotate freely about the axis, the weighted sector causes the disk to orient itself with the weighted point toward the gravitational nadir. When the instrument is placed on the ground with the axle parallel to the isometric, i.e., the line of constant elevation, the third disk is thereby aligned so that the plane of the disk lies in the plane of the maximum slope or inclination, that is, the local uphill-downhill direction. Since the weighted disk aligns itself with the local gravitational vertical, and the housing of the instrument is inclined to the vertical by virtue of resting on the ground, the angular displacement of the disk with respect to the housing yields a measure of the slope or inclination of the ground.

BRIEF DESCRIPTION OF THE DRAWINGS

FIG. 1 is a cut-away elevation view of the magnetic compass showing the dual-disk configuration.

FIG. 2 is a top view of the housing of the preferred embodiment of the invention, including a cut-away view showing the slope-angle indicator.

FIG. 3 is a cut-away elevation view of the slope angle indicator, being a section generally along lines 3—3 of FIG. 2.

FIG. 4 is a perspective view of the weighted disk feature of the slope-angle indicator, showing the analog angular information on the upper rim of the disk, the BCD markings on the lower hemidisk, and the LED/-phototransistor transmissive optical reader.

FIG. 5 is a plan view of the binary coded disk, partially shown.

FIG. 6 is a plan view of the transmissive analog optical encoded disk with tapered iris.

FIG. 7 is a plan view of the reflective analog optical encoded disk with reflective tapered iris.

FIG. 8 is a plan view of the reflective analog optical encoded disk with nonreflective tapered iris.

FIG. 9 is a schematic cut-away elevation view of an embodiment of the invention containing the single-disk, reflective mode configuration.

FIG. 10 is a plan view of the reflective mode emitter-receptor reader.

FIG. 11 is an end view of the single-disk, reflective mode configuration of emitter-receptor reader and reflective disk.

FIG. 12 is a perspective view of the ribbon optical fiber read head, showing the disposition of the read head with respect to the transmissive tapered iris disk.

STRUCTURES AND OPERATION OF THE INVENTION

Figure 13:
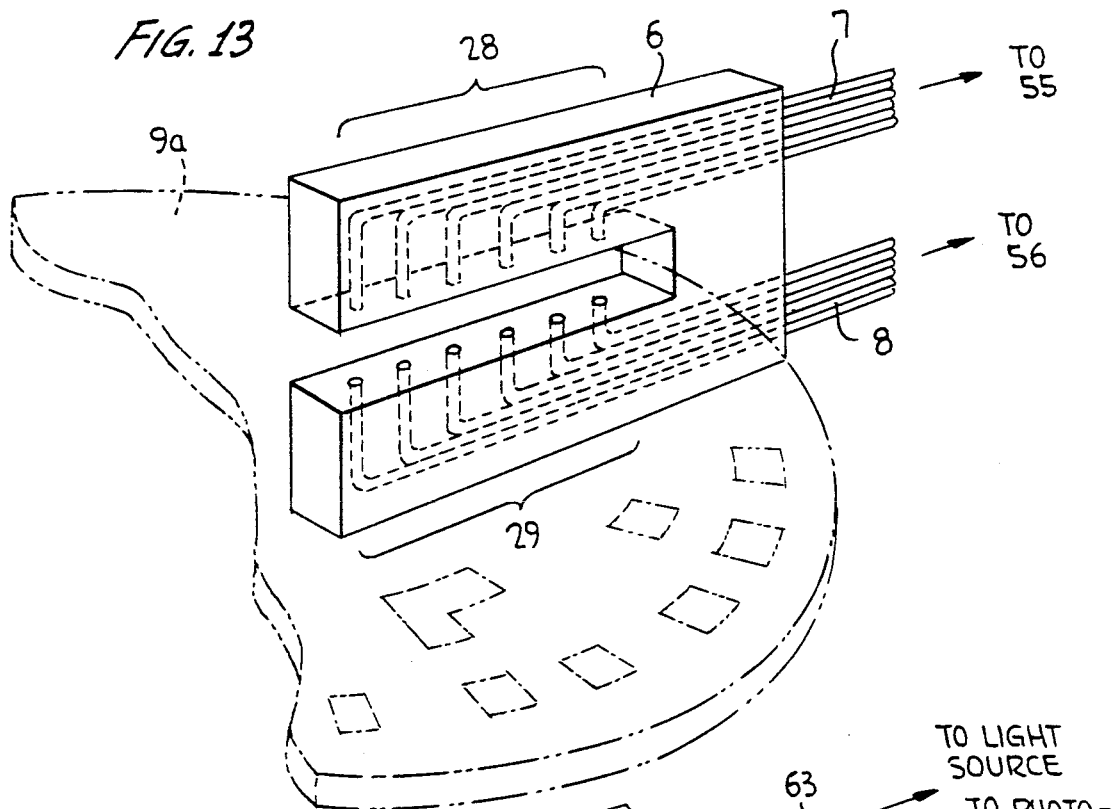
FIG. 13 is a perspective view of the optical fiber transmissive read head.
Figure 14:
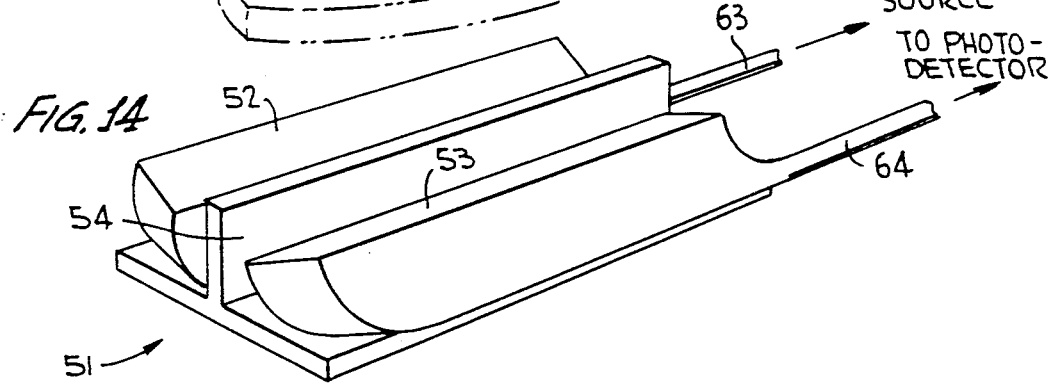
FIG. 14 is a perspective view of the ribbon optical fiber reflective read head, with optical fiber housing omitted for clarity.
Figure 15:
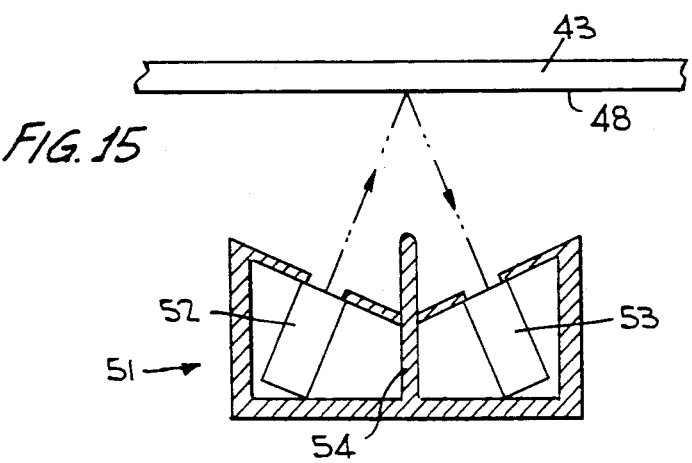
FIG. 15 is an end view of the ribbon optical fiber reflective read head.

Referring to FIGS. 1 and 2, jeweled bearings 1 centered and aligned on opposite sides of a housing 4 act as pivot points for a non-ferrous, non-permeable shaft 10 having sharp points at each end. Fixedly mounted on the shaft 10 is a first disk 3 and a second disk 9. The first disk 3 is an analog compass dial. Disk 3 carries compass dial analog compass heading markings on its face, forming a compass dial 14. Fixedly mounted on disk 3 is a magnet 3a mounted in the plane of the disk 3 and centered upon the center of the disk. Alternatively disk 3 is constructed uniformly magnetized iron with the magnetization parallel to the plane of the disk and with its magnetic axis oriented along the north-south line of the directional markings on the disk. The face 15 of the housing 4 is transparent to light, being made of clear plastic or glass, allowing the user of the instrument to read the compass dial 14.

Second disk 9 is constructed of non-magnetic material. Several alternative embodiments may be used. In the first embodiment, the second disk 9 has painted or otherwise marked on its face, binary coded markings, as shown in FIG. 5, in the form well known in the optical angle encoder art. In this embodiment, the second disk is thus a Binary Coded Disk 9a, or BCD.

The BCD 9a is read by a fiber optic reader 6, shown in FIG. 13, which comprises a light emitter linear array 28 and a light receptor linear array 29, each array being disposed radially with respect to the disk 9a and forming pairs of light receptors and emitters, the members of each pair being in optical opposition to each other. The light emitter array 28 consists of the optical ends of a plurality of input optical fibers 7. The light receptor array 29 consists of the optical ends of a plurality of output optical fibers 8, each optically disposed opposite a corresponding optical end of an optical fiber in the light emitter 28. The fiber optic input lines 7 optically connect a light source 55 (FIG. 1) to the light emitter array 28. The light source 55 may be a plurality of light emitting diodes. The fiber optic output lines 8 optically connect the light receptor array 29 to a photodectector assembly 56, comprising a plurality of phototransistors. Input lines 7 may alternatively have a laser diode or white light as their source. A standard 9 VDC battery is used as the main power source. This source is reduced to 5.1 VDC by a Zener diode regulator, which consists of a diode that becomes conductive when the applied voltage exceeds a critical value and thereby regulates the output voltage. The angular size of the BCD markings and the number of emitter/detector pairs is selected to provide the desired angular resolution, in the manner well known in the optical angle encoder art. The electrical output of the phototransistors 56 is transmitted by electrically conducting wires 57 to a printed circuit board 23 containing electronic circuitry well known in the electronic art to convert the fiber optic output to a digital display. The circuit board 23, light emitting diodes 55, and phototransistors 56 are enclosed by electromagnetic shielding 24. The shielding 24 is just heavy enough to shield the compass dial 3 from any influence of the electromagnetic signals generated by the circuit board 23. The shielding 24 consists of copper sheeting at least 1/64th of an inch. The circuit board 23 generates a digital output in the manner well known in the optical angle encoder art and actuates an LED display 12. (FIG. 1)

Referring to FIG. 6, in the preferred embodiment the second disk 9 is an analog optical encoder 9b. The analog optical encoder 9b comprises a disk made of non-magnetic, transparent material upon which is screen printed opaque material masked so as to leave exposed a transparent iris 42. The iris 42 is tapered in its width in the radical direction with respect to disk 9b. The width of the tapered iris in the radical direction is a monotonic function of angular displacement about the axis of disk 9b so that there is an unambiguous one-to-one relationship between any angular position and width of the iris 42. By reference to FIG. 12, in this embodiment the fiber optic reader 6a comprises a light emitter 68 and light receptor 69 each of ribbon or slit shape, disposed radially with respect to the disk 9b, with the detector 69 disposed optically opposite the light emitter 68. The light emitter 68 is optically connected to the light source 55 by an optical fiber 7a. The source 55 is an incandescent lamp in the preferred embodiment. The light source may also be a light emitting diode (LED), laser diode (LD), or other appropriate source. The light receptor 69 is optically connected to an appropriate solid state photodetector 56 by an optical fiber 8a, such that the photodetector 56, in the manner well known in the art, in conjunction with appropriate circuitry, generates a voltage that is proportional to the intensity of the light which, in turn, is proportional to the width of the iris spanned by the reader 6a. As the compass dial 3 turns with respect to the housing 4, turning dial 9i, the output of the reader 6a varies in a continuous fashion reflecting the changing compass heading. The output voltage for the photodetector 56 is fed to the circuit board 23 by output wiring 57 (FIG. 1) where the signal is converted to a digital reading in millivolts on the LED display 12 by circuitry including a monolithic analog/digital converter by electronics that are well known in the art. It is then a simple matter to calibrate the readout to the corresponding compass heading. As in the previous embodiment, the circuit board 23, light source 55, and photodetector 56 are enclosed by electromagnetic shielding 24.

The iris may be constructed so that there is a linear relationship between the output voltage of the reader 6a and the compass heading, such as a one millivolt increment in output voltage corresponding to a one degree increase in compass heading. This may be done by constructing a disk 9b FIG. 6, with a constant width iris and masking the transparent portion of the iris manually with an opaque material, and manually moving the masking material radially to vary the output voltage at a series of azimuthal positions to adjust the output voltage so that it is in such linear relationship with the compass headings. At each compass heading that is so measured, the position of the masking material may then be recorded together with the corresponding unmasked width of the iris. These measurements may then be used to construct multiple copies of the tapered iris, each of which will produce the desired output voltage that is linearly related to compass heading.

The inner housing 2, shown in FIG. 1, is filled with damping fluid 5 to damp out any oscillations that occur when the compass dial 3 seeks north. A port 30 allows the housing 2 to be filled with the damping fluid 5. Port 30 is permanently sealed after the unit is filled with damping fluid 5. The port 30 may be sealed by head sealing if the housing 4 is made of plastic. The port 30 may be sealed by epoxy if the housing 4 is not plastic.

A further alternative embodiment of the invention, shown in FIG. 9, comprises a single disk 43 which is a magnetized disk bearing a compass dial on its upper surface 47 and BCD markings on its lower surface 48. The lower surface 48 is reflective except for the BCD markings. The BCD markings are sensed by a reflective reader 44, shown in FIG. 9, 10, 11, disposed along a radius of the disk 43 and which comprises a linear array of emitters 45 parallel to a congruent linear array of detectors 46, each being a phototransistor, with each linear array being disposed upon surfaces that are inclined with respect to the centerline of the reader 44 at such angle that light emitted from the emitters 45 will be reflected from the lower surface 48 into the detectors 46. The BCD markings are constructed of nonreflecting surfaces so that the amount of light received by the detector array 46 is digitally related to the position of the disk, yielding a digital output of the reader 44. This digital output is then conducted to the circuit board 23 by electrical wires 78 and the circuit board 23 generates a digital display in the same manner as the two-disk embodiment described above. The circuit board 23, LED 55 and phototransistor 56 may be housed within an electronics compartment 40 located adjacent to the compass compartment 41. An alternative embodiment of the reflective configuration uses the tapered iris system. In this configuration, the lower surface 48 of disk 43, shown in FIG. 7, is screen printed with a nonreflective coating, such as black paint, that is masked to leave exposed a tapered iris 50. Within the tapered iris 50 the reflecting lower surface 48 is exposed. Alternatively, the tapered iris may be made non-reflecting 60 and the lower surface 48 may be made reflective, as in FIG. 8. A fiber optic read head 51 is positioned adjacent to the lower surface 48. Read head 51 comprises a ribbon-shaped emitter 52 and a similar shaped receptor 53, positioned side by side with the line joining them aligned along a radius of disk 43. An opaque shield 54 separates the emitter 52 from the receptor 53 so that light from the emitter 52 cannot reach the receptor 53 directly. The emitter 52 and the receptor 53 are made of light-transmissive material such as clear glass or clear plastic. Emitter 52 is connected to a light source by an optical fiber. Receptor 53 is connected to the photodetector by a ribbon-shaped light pipe.

The separation between the read head 51 and the lower surface 48 is small compared to the width of the read head 51 in the direction perpendicular to the radius of disk 43. The emitter 52 and the receptor 53 are each inclined toward the other in the plane perpendicular to the radius of disk 43 by such angle that light from the emitter 52 will be reflected into the receptor 43 if a reflective portion of lower surface 48 is positioned opposite the point on emitter 52 from which the light is emitted.

The photodetector in this configuration may consist of a photocell or a solar cell. The output of the photodetector is conducted to standard circuitry that produces a digital readout reflective of the intensity of light reaching the photodetector. As the disk 43 rotates in response to changing compass heading, the taper of the iris 50 causes the length of the part of the ribbon-shaped emitter-detector combination 52, 53 that is spanned by the reflective part of surface 48 to also vary in a continuous fashion, causing the output of the photodetector to vary in continuous fashion as well. The result is an analog signal from the photodetector that is representative of the compass heading.

In operation, the unit may be sighted by either a prism peep sight 20 or an "iron sight " 27 such as is used on a hand gun or rifle, the "iron sight" being used in the same manner as the sight on a handgun or rifle is used when aiming. The prism peep sight 20 or the "iron sight" 27 define a reference direction of the housing 4, commonly known as the heading. A lanyard (not shown) may be connected to the lanyard ring 21 to steady the unit when used in a hand-held embodiment. A circular bubble level 11 is located on face 15 to allow the user to level the unit.

The unit may be operated as solely an analog compass or in a dual readout (analog and digital) mode.

The digital circuitry 23 may provide either the direct azimuth heading or a back azimuth heading. Switch 18 together with associated logical circuitry selects between the direct and the back azimuth readouts. A display hold feature is provided through the action of switch and associated logical circuitry. A low voltage indicator light 13 illuminates when the battery 25 voltage drops to 6.0 volts. The analog display may also be backlighted through operation of switch 19.

FIGS. 3 and 4 shown the inclinometer or slope angle indicator assembly. Shaft 31 is mounted orthogonal to shaft 10 and orthogonal to the plane containing the reference direction or heading of housing 4. One end of shaft 31 is fixed to the housing 4. The other end may be supported by a stand-off. Disk 32 is rotatably mounted on shaft 31 by means of a bearing whose length is substantially greater than the thickness of disk 32. "C" clips 35 on each side of disk 32 hold the disk 32 in place on shaft 31 while allowing it to rotate freely. Analog angular information 33 is screen printed or otherwise marked on the rim 66 of the upper half of disk 32. The lower half of disk 32 is weighted with weight 49 relative to the upper half A. The action of gravity aligns disk 32 to thereby provide a zero reference slope angle. Angular information 39 to thereby provide a zero reference slope angle. Angular information 39 is coded on the bottom half of disk 32. An emitter/detector read head 36 is positioned opposite the digitally coded information 39, as shown in FIG. 4. The read head 36 comprises a linear array of light emitting diodes 70 in light congruent disposition with respect to a linear array of phototransistors 71 forming a linear array of pairs of light sources and light detectors in light transmissive disposition with respect to the BCD markings on disk 32. The LEDs 70 are powered by the power supply 58 (FIG. 1) through electrical input wires 37. The electrical output of the phototransistors 71 is transmitted to the circuit board 23 by output wires 38. The slope may be read digitally on the digital display 12 by operating pushbutton switch 22 in association with appropriate logical circuitry. The slope angle may also be read in analog form by viewing the analog angular information 33 through a viewing port 73 in the housing 4. (FIGS. 2, 3) Reference lines 16 and 17 are provided for analog readouts. The deflection of the slope angle indicator will be from zero to ±80.0° of slope. The accuracy of the inclinometer is determined by the number of tracks of BCD markings, and the number of pairs of emitters and detectors, in the manner well known in the optical angle encoder art.

Any of the sensing technologies described above may also be used instead of BCD coding to sense the position of the disk 32.

The output voltage from the reader 36 is converted to a digital signal by a monolithic analog/digital converter, such as a CA3162E converter that provides a 3-digit multiplexed BCD output. For example, a CA3162E may be utilized with a CA3161E BCD-to-seven-segment decoder/driver to form a 3-digit readout display. Other analog to digital converters and decoder/drivers well known in the digital readout art may be utilized to provide 4 or 5 digit displays to accommodate higher resolution BCD encoders on disk 39.

The readout display 12 may alternatively be a liquid crystal or fluorescent liquid crystal display to give a higher degree of resolution in the information provided by the display.

Various modifications and alternative embodiments of the invention can ben provided without departing from the spirit and true scope of the invention. For example, the digital display may be designed to display the heading in both degrees and the nearest compass point, such as 22.5° and NNE simultaneously. The readout display may be remotely located to provide a remote reading compass. Accordingly, it is not intended to limit the invention by what has been particularly shown and described except as indicated in the appended claims.

What is claimed is:

1. A magnetic compass comprising:
    a housing including housing reference direction means,
    a first disk contained within said housing, said disk being a permanently magnetized disk rotatably mounted upon a nonpermeable shaft disposed between jeweled bearings centered and aligned on opposite sides of said housing, said shaft having at each end sharp points acting as pivot points, so as to be freely rotatable within said housing, said first disk having a top surface and a bottom surface, the top surface of said first disk having a compass dial imprinted thereon with the north direction of said compass dial oriented to correspond to the direction of the magnetization of said disk, the housing adjacent to the top surface of said first disk beinq made of visually transparent material allowing the compass dial to be read in analog fashion,
    a second disk, being transparent and contained within said housing and affixed to said shaft, said second disk being disposed in opposition to the bottom surface of said first disk, said shaft being freely rotatable within said housing so that said disks are freely rotatable about the common axis of rotation of said disks,
    a read head comprising a light emitter and a light receptor positioned on opposite sides of said second disk in light receptive orientation, a light source, a light detector capable of generating output voltage proportional to the intensity of the light received by said detector, means for modulating the intensity of the light transmitted by said second disk in a manner that unambiguously relates said intensity to the angular displacement of the two disks relative to the reference direction, optical fibers connecting said light source to said emitter, optical fibers connecting said receptor to said detector,
    electronic circuitry capable of converting said output voltages to a digital display whereby the angular displacement of the magnetized disk with respect to the housing may be displayed, thereby providing a readout of the compass heading,
    electrical connection between the light detectors and said electronic circuitry, and
    electrically conducting matter disposed in a closed surface enclosing said circuitry, with said first disk positioned outside said surface, the electrically conducting matter being of sufficient conductivity and thickness to electrically shield said first disk from the electrical influence of said circuitry.

2. A dual readout analog/digital magnetic compass, being a compass according to claim 1 wherein the second disk is constructed of optically transparent material and has imprinted thereon binary coded digital opaque markings whereby the light transmitted by said disk is modulated in a digital manner causing the said output voltages to be digitized whereby the angular displacement of the said disks relative to said housing is displayed by the readout in a digital display.

3. A magnetic compass according to claim 1 wherein said second disk is constructed of transparent material upon which is imprinted opaque material masking a transparent iris through said second disk, the edges of said iris being a figure having a first radial edge and a second radial edge located radially opposite said first radial edge, each said radial edge having an inner end and an outer end, and two generally concentric edges being an outer edge and an inner edge, the outer edge connecting the outer ends of the two radial edges and the inner edge connecting the inner ends of the two radial edges, the generally concentric edges being tapered in the radial direction with respect to angular displacement about the axis of said disk, an optical read head comprising a ribbon shaped light-transmissive fiber optic input terminal disposed on one side of said disk and a congruently shaped light-transmissive fiber optic output terminal disposed in light receptive position on the other side of said disk, said terminals being aligned along a radius of said disk, with said input terminal connected to a light source by an optical fiber and said output terminal connected to a photodetector by a ribbon shaped optical fiber, said photodetector being capable of generating an output voltage proportional to the intensity of the light received by said photodetector, thereby resulting in an output voltage from said read head that varies in continuous fashion as the second disk rotates, and
  means for converting said output voltage to a digital readout display.

4. A magnetic compass and inclinometer, comprising a magnetic compass according to claim 1 wherein is included an inclinometer comprising a third disk rotatably mounted so as to rotate freely about its central axis, said axis being disposed orthogonal to the shaft connecting first disk to second disk and orthogonal to the plane containing said shaft and the housing reference direction, said third disk having a first hemidisk and a second hemidisk, said first and second hemidisks being disposed on opposite sides of a diameter of said third disk, a reference radius of said third disk being disposed orthogonal to said diameter and lying within said first hemidisk,
  means to cause said third disk to automatically orient itself so that the reference radius is vertical when the housing is oriented with the central axis of said third disk horizontal and so that said first hemidisk is disposed above said central axis with respect to the center of the earth,
  means to sense and read out the angular displacement of the housing from the reference radius of said third disk.

5. A magnetic compass according to claim 4 wherein said means to sense and read out the angular displacement of the housing from said reference radius of said third disk comprises analog angular information imprinted upon said first hemidisk and means to observe said analog information visually,
  second hemidisk being constructed of optically transparent material,
  binary coded digital opaque markings imprinted upon said second hemidisk,
  second optical read head disposed about said second hemidisk in a radial configuration, said second optical read head comprising a plurality of input and output optical fibers with ends positioned on opposite sides of said third disk in two linear arrays in light receptive orientation, the input optical fibers being connected to a light source and the output optical fibers being connected to light detectors capable of generating output voltages proportional to the intensity of the light received by said detectors, said third disk being provided with means for modulating the intensity of the light transmitted by said third disk to the output optical fibers in a manner that unambiguously relates said intensity to the angular displacement of said third disk relative to said housing,
  electronic circuitry capable of converting the output of said second optical readhead to a digital display whereby the angular displacement of said third disk with respect to the housing may be displayed,
  electrical connection between the output of said second readhead and said circuitry.

6. A magnetic compass according to claim 4 wherein the means to sense and read out the angular displacement of the housing from the reference radius of said third disk comprises said third disk being constructed of transparent material upon which is imprinted opaque material masking a transparent iris through said third disk, the edges of said iris being a figure having a first radial edge and a second radial edge located radially opposite said first radial edge, each said radial edge having an inner end and an outer end, and two generally concentric edges being an outer edge and an inner edge, the outer edge connecting the outer ends of the two radial edges and the inner edge connecting the inner ends of the two radial edges, the generally concentric edges being tapered in the radial direction with respect to angular displacement about the axis of said third disk, an optical read head comprising a ribbon shaped light-transmissive fiber optic input terminal disposed on one side of said third disk and a congruently shaped light-transmissive fiber optic output terminal disposed in light receptive position on the other side of said third disk, said terminals being aligned along a radius of said third disk, with said input terminal connected to a light source by an optical fiber and said output terminal connected to a photodetector by a ribbon shaped optical fiber, said photodetector being capable of generating an output voltage proportional to the intensity of the light received by said photodetector, thereby resulting in an output voltage from said read head that varies in continuous fashion as said third disk rotates, and
  means for converting said output voltage to a digital readout display.

7. A magnetic compass comprising a housing containing a damping liquid therein and including:
  a disk having an upper surface and a lower surface, rotatably mounted so as to rotate freely, having a compass dial imprinted on the upper surface,
  a magnet affixed to said disk and disposed therewith so as to align said disk with respect to the earth's magnetic field,
  the part of said housing above said compass dial being visually transparent,
  said lower surface being disposed of reflective and absorptive areas representative of the angular position about the axis of rotation of said disk wherein binary coded digital markings are imprinted upon the lower surface of said disk, encoding the compass headings of said disk, the said markings being light-absorptive, the remainder of said lower surface being optically reflective, a reflecting optical read head disposed adjacent to the bottom surface of said disk and comprising two parallel linear arrays of a multiplicity of optical fiber terminals, said linear arrays being disposed parallel to a radius of said disk, said arrays being an emitting array and a receiving array, each array being inclined toward the center line between the two arrays at such angle that light emitted by a terminal of an optical fiber in the emitting array will be reflected by the lower surface of said disk into the adjacent optical fiber terminal in the receiving array if a reflective area of said disk is positioned opposite the emitting fiber whereas said light will be absorbed if a light-absorptive marking is positioned opposite the said terminal, a light source with power source therefore included therein, a multiplicity of optical fibers connecting the terminals of the optical fibers in said emitting array to said light source and the receiving array being connected by optical fibers to a multiplicity of light sensors for sensing the code marked on the lower surface of the disk, means for converting the received light into electrical signals representative of the compass heading, electronic circuitry, including a source of electrical power and a digital readout display, capable of producing a digital readout display of the compass heading, and means for transmitting said electrical signals representative of the compass heading to said electronic circuitry.

8. A magnetic compass comprising:

a housing, a disk contained within said housing, said disk being a permanently magnetized disk rotatably mounted upon a non-permeable shaft disposed between jeweled bearings centered and aligned on opposite sides of said housing, said shaft having at each end sharp points acting as pivot points, so as to be freely rotatable within said housing, said disk having a top surface and a bottom surface, the top surface of said disk having a compass dial imprinted thereon with the north direction of said compass dial oriented to correspond to the direction of the magnetization of said disk, the housing adjacent to the top surface of said first disk being made of visually transparent material allowing the compass dial to be visually read in analog fashion, the bottom surface of said disk being composed of light-reflective material covered with non-reflective material except for a portion thereof whereat an open iris exposes said reflective material, the edges of said iris being a figure having a first radial edge and a second radial edge located radially opposite said first radial edge, each said radial edge having an inner end and an outer end, and two generally concentric edges being an outer edge and an inner edge, the outer edge connecting the outer ends of the two radial edges and the inner edge connecting the inner ends of the two radial edges, the generally concentric edges being tapered in such manner that the width of the iris in the radial direction is a monotonic function of angular position about the axis of the disk, an optical read head comprising an emitter terminal and a receptor terminal, each of said terminals being composed of light-transmissive optic fiber material with a planar face, said faces each being rectangular in shape having two long sides and two short sides, the long sides being sensibly longer than the maximum width of the iris and the short sides being small compared to said maximum width, said terminals being disposed with their long sides side by side to each other and in a radial direction with respect to the disk and in opposition to the lower surface of said disk and positioned so that the separation between said lower surface and the terminals is small compared to the short sides of said terminals with the planar faces of said terminals facing toward the disk and inclined toward each other in the plane perpendicular to the long sides at such angle that light emitted from the emitter terminal will be reflected into the receptor terminal by the exposed reflective surface within the iris with a fence-shaped baffle positioned along the vertex formed by said terminals and extending perpendicular to the plane of the disk, said baffle being as long as the long sides of said terminals and extending in height in the direction toward said disk to such distance that it shields the receptor terminal from light emitted by the emitter terminal, an optical fiber connecting the emitter terminal in light-transmissive manner with a light source with power therefore contained within the housing, an optical fiber connecting the receptor terminal in light-transmissive manner with a photodetector capable of generating an output voltage proportional to the intensity of light received by said photodetector, means for converting said output voltage to a digital readout display representative of the compass heading.

9. A magnetic compass according to claim 8 wherein said photodetector is a photocell.

10. A magnetic compass according to claim 8 wherein said photodetector is a solar cell.

* * * * *